United States Patent [19]

Takahashi et al.

[11] Patent Number: 4,486,873
[45] Date of Patent: Dec. 4, 1984

[54] DISC LOADING MECHANISM

[75] Inventors: Hideyuki Takahashi; Isami Kenmotsu; Takahiro Okajima; Yoshio Takahashi, all of Saitama, Japan

[73] Assignee: Pioneer Electric Corporation, Tokyo, Japan

[21] Appl. No.: 389,355

[22] Filed: Jun. 17, 1982

[30] Foreign Application Priority Data

Jun. 20, 1981 [JP] Japan .................................. 56/94572

[51] Int. Cl.³ ...................... G11B 25/04; G11B 17/04
[52] U.S. Cl. .................................... 369/77.1; 369/270
[58] Field of Search .................... 369/75, 77, 79, 270, 369/271, 75.2, 79, 77.1

[56] References Cited

U.S. PATENT DOCUMENTS

| 3,658,347 | 4/1972 | Cheeseboro | 369/77.1 |
| 3,799,556 | 3/1974 | Watanabe | 369/75.2 |
| 4,302,832 | 11/1981 | Cheeseboro | 369/77.1 |
| 4,337,533 | 6/1982 | Ando et al. | 369/75.2 |

Primary Examiner—Steven L. Stephan
Attorney, Agent, or Firm—Sughrue, Mion, Zinn, Macpeak & Seas

[57] ABSTRACT

A disc loading mechanism includes a rotatably and linearly movable tray onto which the disc is inserted and positioned, and a cam mechanism driven to lower the disc onto a turntable and separate the tray from the disc.

9 Claims, 15 Drawing Figures

DISC LOADING MECHANISM

BACKGROUND OF THE INVENTION

This invention relates to a disc loading mechanism for an audio disc player of the optical PCM sound recording type, which is characterized in that a disc is placed on a tray which is supported movably between a disc inserting position and a disc reproduction position, and the disc is engaged with a disc rotating rotary shaft by moving a driving cam coming into contact with a tray supporter. Prior devices have included devices for moving a disc between rollers, or while suspended on a clamp working at the center hole thereof, as disc loading mechanisms for an auto-loading record player.

However, the former device compresses the disc surface to sometimes strain or damage the recording track, and the latter device is capable of damaging the center hole due to external oscillation, since the disc is supported only by the center hole.

Furthermore, both mechanisms are of large size and are complicated, and it is considerably difficult to extract the disc midway through a carrying-in operation.

SUMMARY OF THE INVENTION

An object of the invention is therefore to obtain a miniature and compact disc loading mechanism which will not damage the disc in normal operation or when normal operation is hindered by a disturbance, and in which extraction of the disc is possible, if required, midway through a carrying operation.

BRIEF DESCRIPTION OF THE DRAWINGS

The invention will now be described with reference to the accompanying drawings; in which.

DETAILED DESCRIPTION OF THE PREFERRED EMBODIMENTS

Figure 1:
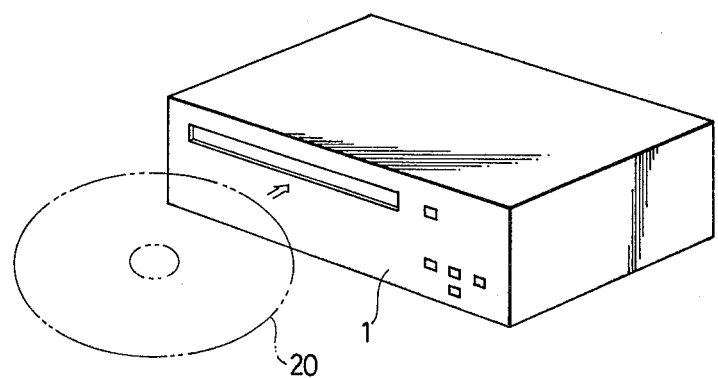
FIG. 1 is a perspective view of a preferred embodiment of the invention.

FIG. 1 shows the surface appearance of the device, wherein operating switches and a slit for inserting a disc 20 are provided on the front panel of a player cabinet 1.

Figure 2A:
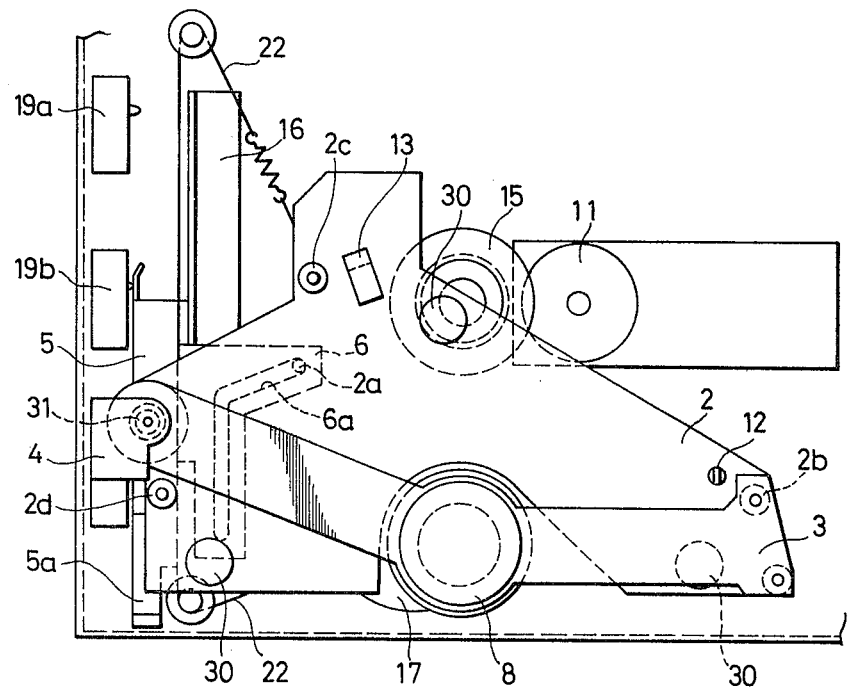
FIGS. 2(a) and 2(b) are a plan view and a front view, respectively, of the internal mechanism.
Figure 2B:
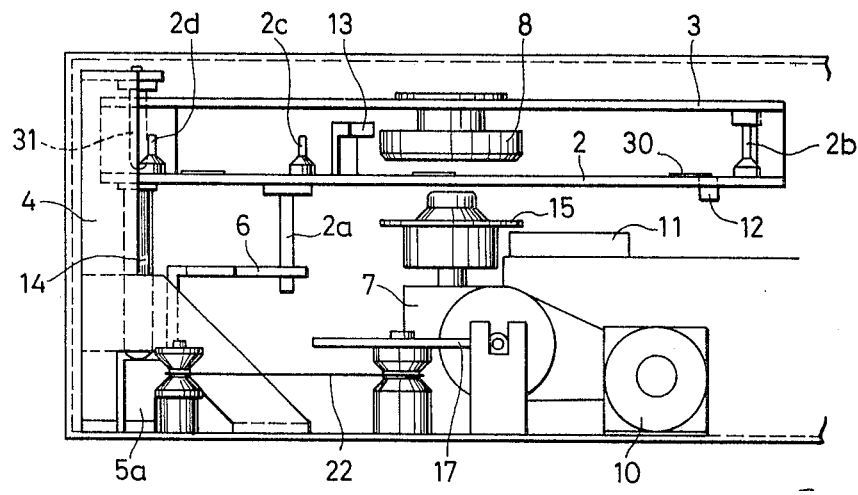

FIGS. 2(a) and 2(b) are a plan view of an internal mechanism and a front view thereof. The internal mechanism comprises a phono motor 7, a pickup 11 moving linearly and radially of the disc, and a tray 2 for transferring the disc inserted through the slit onto the phono motor 7 and its driving mechanism.

The tray 2 is supported horizontally rotatably and vertically slidably on a rotary shaft 14 provided at the left end thereof and on a supporting shaft 31 fixed on a bend at the upper side of a tray support 4.

The rotary shaft 14 of the tray 2 is positioned leftwardly at close to the midpoint between a disc inserting position whereat the disc inserted through the slit is placed on the tray 2, and a disc reproducing position whereat the disc is clamped for reproduction on a small turntable 15 (supporting only the periphery about the disc center hole) which is fixed on a rotary shaft of the phono motor 7.

Figure 4A:
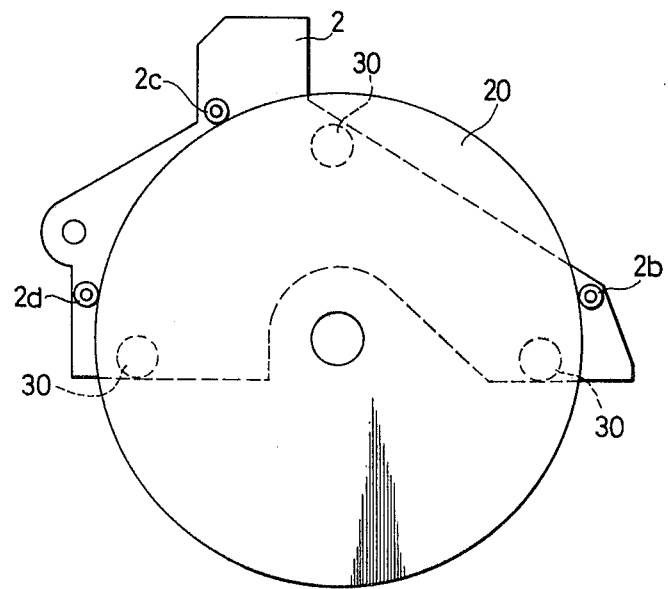
FIGS. 4(a)-4(c) are operational drawings representing the positional relation between a disc and a guide pin.
Figure 4B:
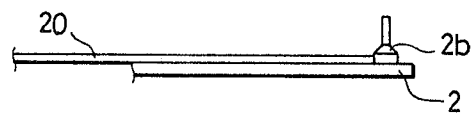

As shown in FIGS. 4(a) and 4(b), three tapering guide pins 2b, 2c and 2d are provided on the upper surface of the tray 2, and the disc inserted through the slit comes into contact with the root or thick parts thereof to thereby locate the disc.

Figure 4C:
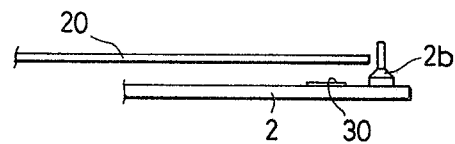

Then, as shown in FIG. 4(c), when the tray descends to separate from the disc for playback, the disc moves to confront the slender parts of the guide pins, to thus be disengaged therefrom.

A front-back discriminating element 12 is provided near the guide pin 2b to optically detect whether or not a recorded face is correctly kept downward, and an insertion completion detecting element 13 is provided near the guide pin 2c to optically detect whether the inserted disc is correctly positioned.

Three brake pads 30 consisting of felt or rubber which prevent disc damage and dislocation and also work as a brake when the disc is stopped are provided on the upper surface of the tray 2. Braking is controlled by suitably selcting the number and size of the brake pads (which can fully cover the surface on which the disc is placed).

Figure 3:
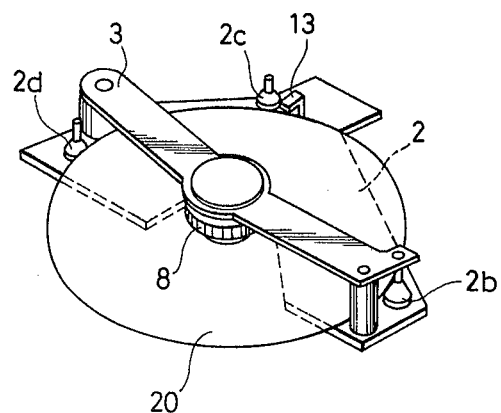
FIG. 3 is a perspective view of the tray.

A clamper supporting plate 3 is fixed over the tray 2 at a given spacing 1, and a clamper 8 for clamping the disc on the turntable 15 for playback is supported loosely at the center thereof. (FIG. 3)

Figure 7:
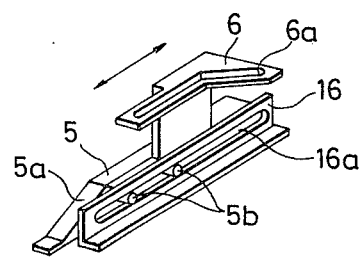
FIG. 7 is a perspective view of a driving cam and a guide plate.

As shown in FIG. 5, the driving cam 5, with which the lower end of the rotary shaft 14 of the tray 2 comes in contact, is supported so as to be longitudinally movable along a guide groove 16a of a slide plate 16 (FIG. 7), and the tray 2 moves vertically according to the movement thereof.

The driving pin 2a projecting from the tray 2 is engaged with a guide groove 6a of a guide plate 6 (FIG. 7) fixed to the driving cam 5, and the tray 2 rotates in a horizontal plane according to the movement of the guide plate.

Figure 6:
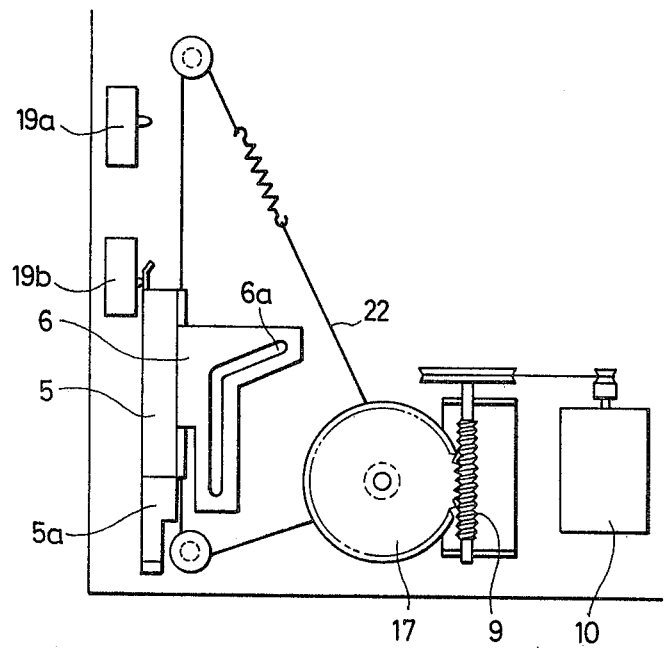
FIG. 6 is a plan view of a tray driving mechanism.

The driving cam 5 (and the guide plate 6) are driven, as shown in FIG. 6, by a motor 10 through worm gear 9, main gear 17 and wire 22, and its stop position is determined by limit switches 19a and 19b.

Figure 5A:
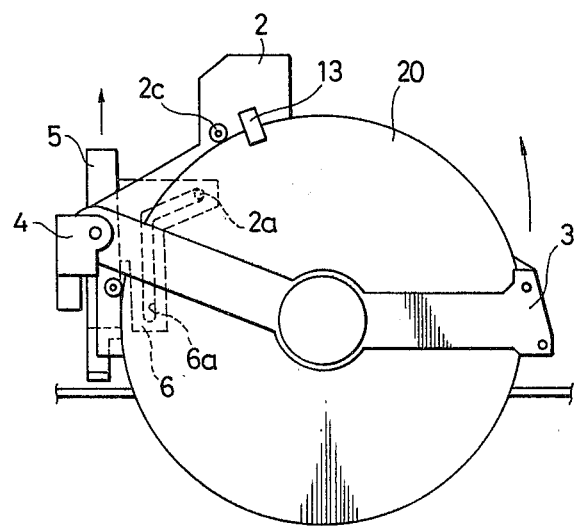
FIGS. 5(a) and 5(a)', 5(b) and 5(b)', and 5(c) and 5(c)' are plan views and side views, respectively, representing the operation of the tray, wherein figure reference characters (a), (b) and (c) indicate the loading start, tray rotation completion and loading completion states, respectively.
Figure 5A:
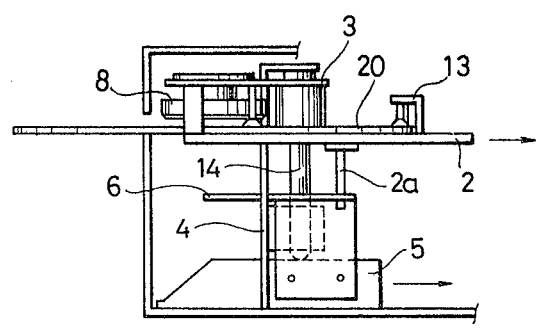
Figure 5B:
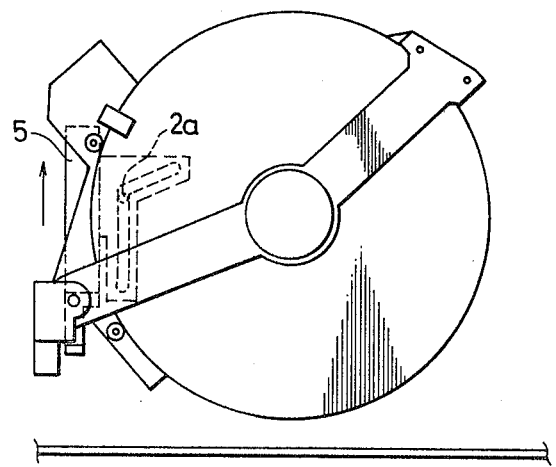
Figure 5B:
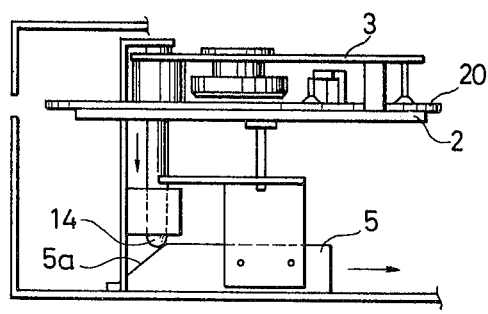
Figure 5C:
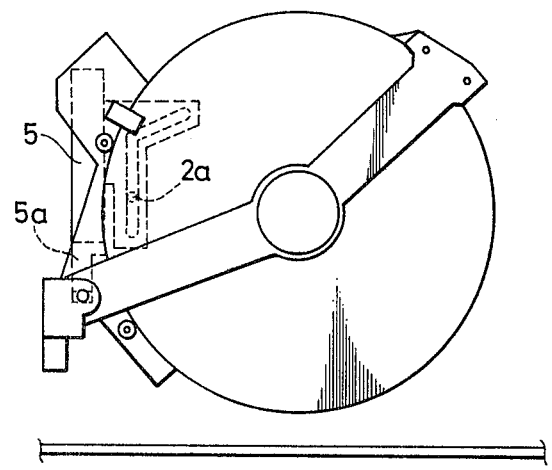
Figure 5C:
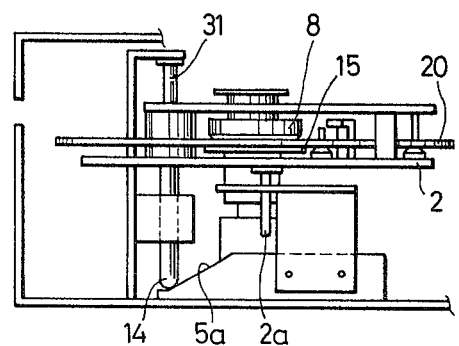

The operation of the thus constructed device will now be described with reference to FIGS. 5(a)-5(c)'.

When the disc 20 is inserted through the slit provided on the front panel, the disc slides along the upper surface of the tray 2 to come in contact with the three guide pins 2b, 2c and 2d, and is thus placed in an initial position.

When the insertion completion detecting element 13 detects that the disc is positioned correctly, the driving motor 10 is actuated, the driving cam 5 and the guide plate 6 move backward, and thus the tray 2 is rotated counterclockwise (viewed from above).

The front-back discriminating element 12 operates at a position where the tray 2 is rotated somewhat and allows the loading operation to proceed where the recording face of the disc is oriented downwardly but reverses the rotation of the motor 10 to return the tray 2 to the insertion position when the recording face is oriented upwardly.

When the tray 2 is rotated as far as the playback position and thus the center of the disc 20 comes upon the shaft of the phono motor 7, the tray 2 stops, and when the driving cam 5 moves further backward, the rotary shaft 14 descends along a slope of the cam surface 5a to drop the disc 20 onto the turntable 15.

The disc 20 is clamped on a magnet incorporated in the clamper 8 or the turntable 15, the tray 2 descends further to part from the disc 20 (FIG. 4(c)), and the clamper 8 is spaced slightly from the clamper supporting plate 3 and is made capable of rotating freely.

Then, the driving cam 5 turns on the limit switch 19a to stop the driving motor 10, and the phono motor 7 is actuated to commence automatic playback.

When an ejector switch provided on the front panel is pushed to stop playback midway in or when the pickup 11 reaches the circumference of the disc 20 to stop playback, the power to the phono motor 7 is cut off, and the pickup 11 is reset.

Next, the driving motor 10 begins rotating in the direction reverse to that used for loading, and when the driving cam 5 moves forward to elevate the tray 2, the disc 20 is released from clamping, and comes in contact with the brake pads 30 to stop.

Furthermore, the guide plate 6 moves forward to turn the tray 2 clockwise, and the operation comes to a stop at the disc inserting position.

In the above embodiment, three tapering guide pins are employed as positioning members, however, the members are not necessarily limited to such shape. The point is that any pin shape will be acceptable if they have a guide part such as will diverge from the disc center as it parts from the surface on which the disc is placed, and there variants are conceivable. For example, columnar pins provided slantingly outside or cams having a given slope may be provided, and the number of positioning members may be as low as two.

The tray is not necessarily required to rotate for the horizontal movement, and thus can be moved linearly, for example, on a rail.

As described above, in a disc loading mechanism according to this invention, a disc is simply placed on a tray supported movably between a disc inserting position and a disc reproduction position, and the disc is engaged with a disc rotator by moving a driving cam contacting a tray supporting means. Therefore, the mechanism can be miniaturized and simplified, the disc is free from being damaged even when the normal operation is hindered by a disturbance, the disc can be extracted without trouble even midway through carrying-in, and further an effect is obtainable such that the tray can be reset by merely providing a simple electric circuit to reverse a driving device.

It will be apparent that the disc loading mechanism according to the invention can be employed for not only the audio disc player described in the above embodiment but also for any player using a disc, such as a video disc or record.

What is claimed is:

1. A disc loading mechanism, comprising:
   disc rotating means for rotating said disc when engaged therewith at a disc reproduction position;
   a flat tray for receiving an inserted disc thereupon at a disc insertion position and for transporting said disc horizontally to a disc reproduction position whereat said tray separates vertically from said disc, said tray including guide means on the outer periphery of the flat area of said tray for engaging and centering said disc on said flat area, said tray being supported to be movable between said disc insertion position and said disc reproduction position;
   a driving cam having a varying vertical thickness;
   cam contacting means for supporting the tray on the upper side of said driving cam said driving cam; and
   driving means for moving horizontally said driving cam thereby moving said tray as said contacting means follows the vertical thickness of said cam, said disc inserted onto said tray being vertically engaged with said disc rotator means by moving said driving cam.

2. A disc loading mechanism as claimed in claim 1, wherein said tray is arranged so as to be rotatable about a rotary shaft between the disc insertion position and the disc reproduction position, and movable in the direction along the length of said rotary shaft at said the disc reproduction position.

3. A disc loading mechanism as claimed in claim 1, wherein said tray is mounted for rotation about a single axis displaced from the axis of said disc rotator means and for linear movement parallel to said axis.

4. A disc loading mechanism as claimed in claim 1, said driving cam including a sloped portion which, when engaged with said supporting means, lowers said disc and tray such that said disc engages said disc rotator means and said tray separates from said disc.

5. A disc loading mechanism as claimed in claim 4, said driving cam including a plate portion having guide means therein, said tray including means engaging said guide means and being guided therein to rotate said tray about a rotary shaft displaced from the axis of said disc rotator means when said driving means moves said cam.

6. A disc loading mechanism as claimed in claim 4, said tray including brake means for halting rotation of said disc when said disc abuts said tray.

7. A disc loading mechanism as claimed in claim 1, including means for reversing said driving means to return said disc and said tray to said disc insertion position.

8. A disc loading mechanism as claimed in claim 7, said reversing means including at least ejection selector means and disc orientation detection means.

9. A disc loading mechanism as claimed in claim 1, said guide means being disengaged from said disc when said disc is engaged with said rotator means.

\* \* \* \* \*